United States Patent [19]

Guillot

[11] Patent Number: 5,352,312
[45] Date of Patent: Oct. 4, 1994

[54] METHOD OF INSULATING A ROCKET MOTOR

[75] Inventor: David G. Guillot, Tremonton, Utah

[73] Assignee: Thiokol Corporation, Ogden, Utah

[21] Appl. No.: 927,135

[22] Filed: Aug. 6, 1992

Related U.S. Application Data

[63] Continuation-in-part of Ser. No. 563,906, Jun. 25, 1990, which is a continuation-in-part of Ser. No. 350,079, May 10, 1989, abandoned.

[51] Int. Cl.$^5$ .................. B32B 31/20; B65H 81/06; C09K 21/14; F02K 9/08
[52] U.S. Cl. .................. 156/172; 60/255; 156/309.6; 252/299.01; 252/606; 428/920; 523/138; 523/179
[58] Field of Search .................. 252/299.01, 606, 62; 523/138, 179; 524/59, 71, 847; 428/920; 156/172, 305, 309.6; 60/255

[56] References Cited

U.S. PATENT DOCUMENTS

| | | | |
|---|---|---|---|
| 3,126,306 | 3/1964 | Sherman | 156/187 |
| 3,177,175 | 4/1965 | Barry | 523/138 |
| 3,314,915 | 4/1967 | Baughman et al. | 523/179 |
| 3,347,047 | 10/1967 | Hartz et al. | 60/253 |
| 3,395,035 | 7/1968 | Strauss | 523/179 |
| 3,397,168 | 8/1968 | Kramer et al. | 428/307.3 |
| 3,421,970 | 1/1969 | Daly et al. | 428/98 |
| 3,449,191 | 6/1969 | Taylor | 156/306 |
| 3,459,701 | 8/1969 | Chandler et al. | 523/138 |
| 3,472,812 | 10/1969 | Byrne et al. | 523/179 |
| 3,562,304 | 2/1971 | Tucker | 523/138 |
| 3,875,106 | 4/1975 | Lazzaro | 523/179 |
| 3,914,513 | 10/1975 | Brown et al. | 428/425 |
| 3,969,264 | 7/1976 | Davis | 252/299 |
| 3,991,004 | 11/1976 | Takekoshi et al. | 524/847 |
| 4,064,872 | 12/1977 | Caplan | 128/2 H |
| 4,205,035 | 5/1980 | Kröger et al. | 264/120 |
| 4,369,297 | 1/1983 | Bilow | 526/284 |
| 4,384,016 | 5/1983 | Ide et al. | 428/1 |
| 4,394,498 | 7/1983 | Kastelic | 528/193 |
| 4,492,779 | 1/1985 | Junior et al. | 523/138 |
| 4,495,764 | 1/1985 | Gnagy | 60/255 |
| 4,501,503 | 2/1985 | Buirley et al. | 374/162 |
| 4,507,165 | 3/1985 | Herring | 156/191 |
| 4,514,541 | 4/1985 | Frances | 524/514 |
| 4,515,912 | 5/1985 | Sayles | 523/456 |
| 4,596,619 | 6/1986 | Marks | 156/171 |
| 4,600,732 | 7/1986 | Junior et al. | 523/138 |
| 4,617,371 | 10/1986 | Blumstein et al. | 528/194 |
| 4,624,872 | 11/1986 | Stuetz | 428/1 |
| 4,631,328 | 12/1986 | Ringsdorf et al. | 526/259 |
| 4,637,896 | 1/1987 | Shannon | 252/299 |
| 4,686,135 | 8/1987 | Obayashi et al. | 428/265 |
| 4,696,990 | 9/1987 | Noonan et al. | 526/304 |
| 4,798,849 | 1/1989 | Thomas et al. | 521/114 |
| 4,861,515 | 8/1989 | Minamisawa et al. | 252/299.01 |
| 4,863,367 | 9/1989 | McGregor | 425/438 |
| 4,864,537 | 9/1989 | Michl et al. | 365/127 |
| 4,888,127 | 12/1989 | Wada et al. | 252/299.01 X |
| 4,956,397 | 9/1990 | Rogowski et al. | 523/138 |
| 5,017,304 | 5/1991 | Hijikata | 252/299.01 |
| 5,038,561 | 8/1991 | Chase | 60/255 X |

OTHER PUBLICATIONS

Ethyl Chemicals Group Material Safety Data Sheet, Jan. 24, 1989.
"Polyether block amide: high-performance TPE", Joseph R. Flesher, Jr.; *Modern Plastics*, Sep. 1987; copyright 1987 by McGraw-Hill, Inc.

(List continued on next page.)

*Primary Examiner*—Richard D. Lovering
*Attorney, Agent, or Firm*—Madson & Metcalf

[57] ABSTRACT

Rocket motor insulation compositions are provided. An important component of such insulation compositions is a thermoplastic liquid crystal polymer. Such a polymer provides an ablative insulation which has good performance characteristics during operation of the rocket motor. One such thermoplastic liquid crystal polymer is a wholly aromatic polyester known as VECTRA®. The insulation may also include fillers such as fibrous fillers and particulate fillers. Typical fibrous fillers include glass or carbon fibers. Typical particulate fillers include materials such as silica, alumina, powdered coal, and the like.

15 Claims, 2 Drawing Sheets

OTHER PUBLICATIONS

"Hytrel . . . the Low Cost Alternative to Thermoset Rubber", brochure and price sheet effective Apr. 26, 1987.

"Vectra Liquid Crystal Polymer Standard Grades Price List", Celanese Engineering Resins, Inc.; effective Apr. 26, 1987.

"Liquid-Crystal Polymers; In a Class of Their Own", Lawrence K. English, Assistant Editor; *ME*, Mar. 1986; pp. 36 through 41.

"A New Chemical Resistant Liquid Crystal Polymer", F. C. Jaarsam, J. C. Chen, D. O. Conley; Liquid Crystal Polymer Business Unit, Division of Celanese Corporation; given at the 1985 Plastics Symposium "Managing Corrosion With Plastics", pp. 8/1 through 8/6.

"Nitrile-Butadiene Rubber In Ablative Applications", J. H. Daly, W. A. Hartz, D. A. Meyer, and J. G. Sommer; Research and Development Divisions, The General Tire and Rubber Company; 1974 "Applied Polymer Symposium" No. 25,261-174.

"PEBAX Polyether block amide . . . a unique new family of engineering thermoplastic elastomers", information brochure; pp. 1 through 14.

"Laminated Wood-Based Composites To Mass Transfer"; Kirk-Othmer *Encyclopedia of Chemical Technology*, Third Edition, vol. 14; John Wiley & Sons; pp. 395 through 418.

"Vectra A230", Vectra Data Sheet; Celanese Specialty Operations, a Division of Celanese Corporation (1987).

"Vectra A515", Vectra Data Sheet; Celanese Specialty Operations, a Division of Celanese Corporation.

"Austin Black 325", Typical Product Analysis information sheet; VenBlack, Inc. Sophia, W.Va.; marketed by Harwick, Akron, Ohio.

"ALR-6368" Product Bulletin; DuPont Company, Polymer Products Department.

"DuPont Alcryn Melt Processible Rubber", information brochure; DuPont Company, Polymer Products Department.

"Material Safety Data Sheet for Polyether Block Polyamide Copolymer", Atochem, Inc.

METHOD OF INSULATING A ROCKET MOTOR

RELATED APPLICATIONS

This application is a continuation-in-part of Applicant's pending U.S. patent application Ser. No. 07/563,906, filed Jun. 25, 1990, entitled "Thermoplastic Ablative Insulation," which is a continuation-in-part of Applicant's U.S. patent application Ser. No. 07/350,079, filed May 10, 1989, entitled "Thermoplastic Ablative Insulation," now abandoned, which applications are incorporated herein by this reference.

BACKGROUND

1. The Field of the Invention

The present invention is related to ablative insulation for use in rocket motors. More particular, the present invention relates to the use of thermoplastic liquid crystal ablative materials for use in rocket motor insulations.

2. Technical Background

The combustion of a propellant in a rocket motor creates a hostile environment characterized by extremely high temperatures, pressures, and turbulence. The combustion temperature within a typical rocket motor may exceed 5,000° F. Pressure within the motor frequently exceeds 1,500 psi ($1.02 \times 10^5$ g/cm). Gas velocity typically reaches or exceeds Mach 0.2 near the throat of the rocket motor.

It will be appreciated that this is an extremely hostile environment and presents difficult challenges in providing adequate materials which perform well under these conditions. It is particularly difficult to adequately insulate the rocket motor casing and other heat sensitive parts from the extreme environment necessary to produce the necessary thrust. It is well known to those skilled in the art that if insulation within a rocket motor fails, it is probable that the motor as a whole will fail. This may occur, for example, because the propellant burns through the motor case.

The environment is particularly hostile in a solid rocket motor because the combustion gases produced typically contain dispersed liquid droplets of materials such as aluminum oxide. These droplets are believed to produce erosion by blasting the interior of the rocket motor case. While the combustion of a rocket propellant is usually brief, the conditions described above can readily destroy unprotected rocket motor casings, and jeopardize the mission of the motor.

For the reasons stated above, parts of a rocket motor which are exposed to the high temperatures, pressures, and erosive flow conditions generated by the burning propellant are usually protected by a layer of insulation. Various materials, both filled and unfilled, have been tried as insulation. However, it will be appreciated that it is difficult to provide adequate insulation materials because those materials are again subjected to the extreme conditions within the rocket motor.

A number of materials have been tried as rocket motor insulations. Such materials include phenolic resins, epoxy resins, high temperature melamine-formaldehyde coatings, ceramics, polyester resins and the like. These materials, when cured, become rigid structures which are essentially unworkable. Thus, construction of the rocket motor, and processing of these materials, is difficult and tedious. In addition, structures formed from these materials are known to crack or blister when exposed to the rapid temperature and pressure changes occurring when the propellant is burned. Thus, failure of the material is of constant concern.

Another type of well known rocket insulation materials are elastomeric polymers reinforced with asbestos, polybenzimidazole fiber, or polyaramid fiber. These compositions are known as "ablative" insulation because the compositions are partially consumed during combustion, but nevertheless provide protection for the rocket motor. Such materials are generally capable of enduring in a rocket motor long enough to allow complete combustion of the propellant. That is, they erode away sufficiently slowly that adequate protection is provided during the operation of the rocket motor. This rate of material reduction, or "material affected rate" ("MAR"), is expressed in terms of the reduction of the thickness of material per second. The remaining thickness of the material which is used to calculated MAR includes the thickness of the remaining materials, as well as the thickness of the associated char.

As mentioned above, one material which has been widely used as an insulation is asbestos. As would be expected, however, environmental and health concerns have led manufactures to seek acceptable replacements for asbestos in rocket motor case insulation. One alternative elastomeric insulation contains aramid polymer fibers in combination with a powder filler. Another alternative is elastomeric insulation which contains polybenzimidazole polymer fibers in combination with a powder filler. All of these materials, however, are found to have characteristics which limit their use as rocket motor insulation.

To alleviate some of the observed problems with conventional ablative insulation, thermoplastic resins have been used as binders in insulation formulations. These materials undergo endothermic pyrolysis, carrying heat away from the insulation. Thermoplastic resins also have high specific heats, and their pyrolysis products have high specific heats and low molecular weights.

Even in view of the potential advantages of such materials, however, their usefulness is generally considered limited because they have melting points significantly below the temperatures reached inside an operating rocket motor. In addition, conventional thermoplastic resin-based materials readily flow when subject to heat. Therefore, it is conventionally thought that such materials must be combined with thermosetting resins, and be impregnated into a refractory or fiber matrix, to prevent the insulation from melting or running off when exposed to the heat and erosion of a rocket motor.

One example of such a matrix is a resin-impregnated open-celled porous ceramic material. Thermoplastic resins impregnated in the ceramic matrix, however, have been observed to cause the ceramic to crack under thermal shock. Another approach is a composite of asbestos and nylon fiber impregnated with a thermoplastic binder, after which the material is further impregnated with a much larger amount of a thermosetting resin. This process, however, ultimately minimizes the amount of thermoplastic resin actually present in the insulation and again relies on environmentally undesirable asbestos.

When thermoplastic binders have been used outside of the systems described above, a particulate filler is typically added to the insulation. A variety of particulate fillers have been proposed. The most common filler is silica in finely divided form. Another potential filler is powdered carbon (coal). Such a filler is usually required in order to provide an operable thermoplastic insulation material.

It can be readily appreciated, therefore, that ablative thermoplastic elastomers provide potential advantages in the manufacture of rocket motor insulation. These materials are easily processible and moldable. They do not cure by polymerization reactions, as do conventional resin systems. As a result, it is possible to work with the material even after it is in place.

It has also been found that properly formulated thermoplastics can be used as ablative insulation in that they resist the tendency to melt and flow away before their function is completed. Generally such compositions include the thermoplastic resin binder, along with particulate filler and fibrous filler. Even in view of the foregoing, thermoplastic resin binder systems have not been widely adopted because of some of the perceived limitations of such materials.

It would, therefore, be an advancement in the art to provide thermoplastic ablative materials which overcame many of the significant limitations of conventional insulation materials. It would be an advancement in the art to provide thermoplastic ablative insulations which had ablative characteristics superior to those of existing thermoplastic ablative materials. It would be a related advantage in the art to provide such materials which also had good mechanical properties. It would be a further advancement in the art to provide such materials which offered ease of processing and permitted structural components to be fabricated directly from the insulation.

Such compositions and methods are disclosed and claimed herein.

BRIEF SUMMARY AND OBJECTS OF THE INVENTION

The present invention is related to the use of thermoplastic liquid crystal polymers as ablative insulation in rocket motors. The liquid crystal polymers may be used alone, or in combination with various other types of materials, including other thermoplastic binders, fibers, and fillers. Generally, the liquid crystal polymer will be substituted for the thermoplastic binder and fibrous filler used in existing thermoplastic insulation formulations. However, because of the fibrous nature of liquid crystal materials, they may be used with further thermoplastic binders and essentially substitute for some or all of the fibrous filler.

The thermoplastic liquid crystal polymers used in the present invention provide excellent chemical resistance, even at elevated temperature. The polymer chains readily orient during flow, resulting in a high level of toughness, strength, and stiffness. The materials are easily processed and incorporated into rocket motor insulation. Indeed, standard thermoplastic processing techniques and conventional equipment may be employed.

In some of the preferred embodiments described herein, the thermoplastic liquid crystal polymers are wholly aromatic polyester polymers. The term "wholly aromatic" refers to the fact that the polymers are compounded from moieties having at least one aromatic ring in the backbone. The polymers are referred to as "liquid crystal" in that the polymer chains readily orient during flow resulting in a high level of toughness, strengthen, and stiffness. It is this highly ordered state, even while molten, which gives rise to the generic term "liquid crystal polymer."

These polymers are highly inflexible and do not form regions of three dimensional crystallinity. They are, however, very highly aligned and ordered, and not amorphous. As mentioned above, these materials provide excellent mechanical properties, chemical resistance, and ease of processing. These characteristics allow components, such as rocket motor insulation, to be fabricated directly from the polymer, and avoid the difficulties encountered when attempting to coat a structural substrate, such as the interior of a rocket motor case. Because liquid crystal chains do not reorient when solid, this type of precise manufacture is possible.

An example of such thermoplastic liquid crystal polymers include VECTRA ®, which is a wholly aromatic polyester based on naphthalene, manufactured by Celanese Engineering Resins, Inc., Summit, N.J. VECTRA includes the following general organic chemical moieties:

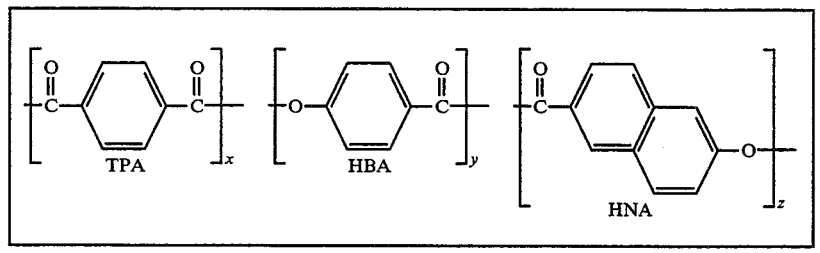

VECTRA may be used alone or it may be reinforced with carbon fiber, or other fillers and fibers. A carbon reinforced VECTRA (30% short carbon fibers) is also available from Celanese Engineering Resins, and is referred to commercially by the trade designation VECTRA A230.

Other thermoplastic liquid crystal polymers having the desired high temperature and ablative characteristics also fall within the scope of the present invention. Such materials include, for example, XYDAR (manufactured by Dartco Manufacturing), and polyethylene ketone (PEEK) (manufactured by Imperial Chemical Industries). PEEK has a relatively high melting point and is readily molded. While these materials show promise, based upon information presently available, VECTRA is preferred in most instances for the manufacture of rocket motor insulation.

It is found that rocket motor insulation formulated using the thermoplastic liquid crystal polymers within the scope of the present invention provide surprising results. In particular, ablative performance is superior, surpassing many presently accepted materials. The ablative performance provides insulation of the rocket motor case during operation, while at the same time limiting the weight of material necessary to provide such insulation. Accordingly, overall performance of the rocket motor is increased.

The rocket motor insulation of the present invention is easily handled and manufactured. The liquid crystal materials are easily processed and avoid difficulties generally encountered in polymer coating of a structural substrate. In addition, the materials do not require any polymerization reaction or crosslinking reaction in order to cure so that the materials are easily worked, even after in place within the rocket motor case.

Accordingly, it is a primary object of the present invention to provide thermoplastic ablative materials which overcome many of the significant limitations of conventional rocket motor insulation materials.

It is a further object of the present invention to provide rocket motor insulation which has ablative characteristics superior to those of conventional thermoplastic ablative insulation materials.

It is another object of the present invention to provide such insulation which also has good mechanical properties.

It is a related object of the present invention to provide such materials which offer ease of processing and permitted structural components to be fabricated directly from the insulation.

It is another object of the invention to provide such insulation materials which avoid difficulties associated with using the polymer material as a coating on a structural substrate.

These and other objects and advantages of the invention will become apparent upon reading the following detailed description and appended claims, and upon reference to the accompanying drawings.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
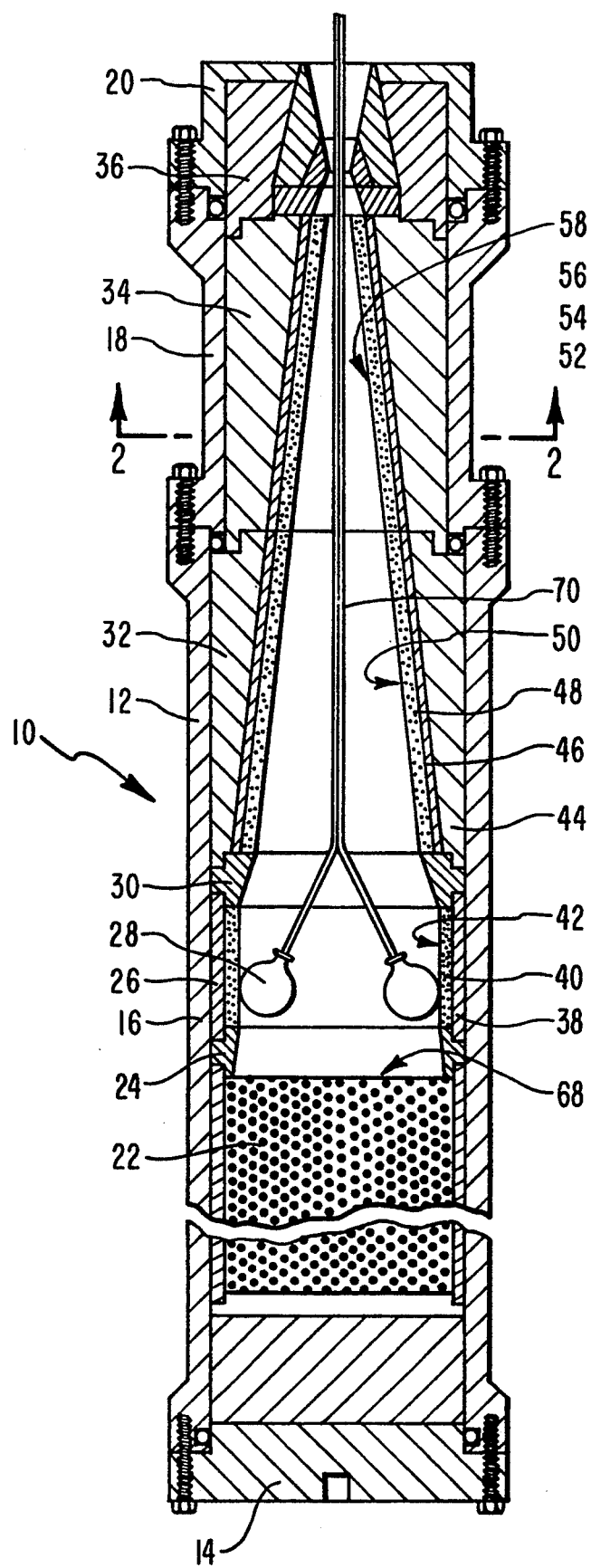
FIG. 1 is a schematic longitudinal section of a test rocket motor used in the Examples to evaluate performance of insulation within the scope of the invention.

The present invention provides improved insulations for rocket motor cases. As mentioned above, rocket motor insulations must protect rocket motor casings from the extreme environment encountered within the rocket motor during operation. This environment is characterized by high temperatures, pressures, and gas flow velocities. In addition, liquid droplets of materials such as aluminum oxide permeate the operating environment.

The present invention provides rocket motor insulations which are thermoplastic, yet provide excellent ablative characteristics. That is, during the operation of the rocket motor an insulating char is formed on the surface of the insulation. This char retards further ablation of the material. Thus, the material erosion rate is minimized.

It will be appreciated that these material characteristics provide multiple advantages. For example, the amount of insulation used can be minimized, resulting in a lighter rocket motor and a greater capacity payload. It is possible to achieve these advantages while still providing excellent insulation results. Thus, the possibility of failure of the rocket motor is reduced.

The present invention employs thermoplastic liquid crystal polymers as an important component of the insulation formulation. Thermoplastic liquid crystal polymers have high degrees of toughness, strength, and stiffness. At the same time, the materials are easily processed by known thermoplastic processing techniques using conventional equipment.

As mentioned above, in some presently preferred embodiments of the invention, the thermoplastic liquid crystal polymers comprise wholly aromatic polyesters. Such materials include, for example, VECTRA®, available from Celanese Engineering Resins, Inc. and XYDAR®, manufactured by Dartco Manufacturing, a Dart Industries subsidiary. These liquid crystal polymers have a rigid, rod-like morphology which is highly aligned resulting in the favorable characteristics discussed herein.

These materials are known to be chemically resistant. This is believed to be due to the aromatic chemical structure and the resulting dense molecular packing. In addition, these materials have excellent mechanical properties. It has been reported that test bars of VECTRA have been stressed to 90% of breaking load and subjected to a variety of solvents, with no evidence of stress cracking or other detrimental effects. Liquid crystal polymers are also known to be resistant to both mineral and oxidizing acids. These properties are important in providing flexible and widely usable rocket motor insulations.

Because these materials do not reorient when they solidify from a melt, it is possible to mold precise parts using these materials. Dimensional stability is also enhanced by the low mold shrinkage values and the low coefficient of thermal expansion.

As mentioned above, various fibers, fillers, and similar materials may also be incorporated into the thermoplastic liquid crystal polymers of the present invention. Examples of fibers which fall within the scope of the present invention include:
polybenzimidazole fiber
polyaramid fiber or pulp
phenolic fiber
carbon fiber
alumina fiber
asbestos (although not presently preferred due to environmental concerns)
mineral wool
glass
nylon fiber
silica fiber
cotton flock
sisal
other natural fibers, or mixtures thereof.

Fibers may be added to the insulation composition such that they constitute from about 0.5% to about 40% of the composition, and more preferably from about 3% to about 10% fiber, with the remainder comprising the thermoplastic liquid crystal polymer and other components of the insulation.

Indeed, certain commercially available formulations of VECTRA include significant percentages of fibers. These include, for example, VECTRA A230 which includes approximately 30% short carbon fibers, and VECTRA C130 which includes approximately 30% glass fiber. Both of these material formulations fall within the scope of the present invention.

Another ingredient of the insulation compositions contemplated herein is a particulate or powdered filler. The most common filler known in the art is silica, particularly fumed silica. Other acceptable fillers include, but are not limited to:

magnesium silicates
powdered coal
powdered neoprene
aluminum
alumina
ferric oxide
cadmium hydroxide
copper
copper-8-quinolinol
fused magnesia
fused zirconia
potassium titanate
silicon carbide
titania
mica
glass
ceramic clays
chromic oxide
phenolic resin particles, and mixtures thereof.

As set forth above, when present in the composition, fiber fillers can constitute from about 0.5% to about 40%, and more preferably from about 3% to about 10% by weight of the insulation composition. Particulate fillers may generally constitute from about 5% to about 45%, and more preferably from about 15% to about 35% by weight of the insulation composition.

A wide variety of other optional ingredients may also be added to the insulation composition. Such materials comprise process aids, plasticizers, tackifiers, antioxidants, dispersing aids, pigments, fire retardants, and the like. These materials are commercially available and well known in the art. In most compositions, such ingredients will constitute up to about 10% of the total composition.

As mentioned above, it is present preferred that the optional ingredients do not include significant amounts of curable resins or cure-inducing amounts of cross-linking agents, curatives, activators, accelerators, or other cure promoting materials. Such materials are expected to detract from the desirable processing characteristics of the insulation formulation. The present invention also provides methods of insulating rocket motors using the insulation compositions of the present invention. Essentially, the method of insulating a rocket motor comprises the steps of:

(a) providing insulation materials comprising thermoplastic liquid crystal polymer(s);
(b) fabricating the insulation materials to form a thermoplastic rocket motor insulating member: and
(c) installing the member in a portion of a rocket motor requiring insulation.

It will be appreciated that step (a) may include mixing the thermoplastic liquid crystal polymer materials with the fibers, fillers, and processing aids described above.

In the fabricating step it is possible to form a piece of the thermoplastic insulation material, lay up the piece on a rocket motor component so portions of the material are in contacting relation, and join the portions by heat sealing the portions together. It is also possible to join the various pieces by applying a molten bead of the thermoplastic liquid crystal polymer between the portions of the piece which are in contacting relation.

In one embodiment of the method of the invention, the laying up is carried out by winding a ribbon of the insulation on a component of a rocket motor requiring insulation. The insulation may be fabricated in a tubular form and the tubular form may be a preform and the preform is deformed by heat into the final shape of an element of said rocket motor insulation. Thus, it will be appreciated that it is a relatively simple task to employ the insulation compositions of the present invention in the actual insulation of a rocket motor.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

Test Motor

Test motors for evaluation of insulation are prepared as follows. Each insulation formulation to be tested is Brabender mixed, milled cut and molded in the shape of a segment of insulation. Each test motor contained many segments of insulation of different compositions. Thus, it was possible to directly compared different potential insulation formulations.

FIG. 1 shows the configuration of a char test motor of the type used herein. Test motor 10 has a casing 12 made up of bulkhead 14, forward segment 16, middle segment 18, and aft segment 20, which are bolted together in the manner illustrated in FIG. 1. Within casing 12 are disposed an end-burning propellant grain 22, a phenolic spacer 24, a low velocity segment 26, an ignition system generally indicated at 28, a phenolic spacer 30, a medium velocity segment 32, a high velocity segment 34, and a nozzle assembly 36. Each of segments 26, 32, and 34 holds sections of insulation to be tested.

Low velocity segment 26 comprises a phenolic beaker 38 within which is adhered insulator 40 having a bore 42. Medium velocity segment 32 comprises an insulation holder 44 supporting a phenolic beaker 46, to which is adhered insulator 48 having a tapered inner bore 50. High velocity segment 34, also illustrated in FIG. 2, comprises an insulation holder 52 supporting a phenolic beaker 54 to which is adhered insulator 56 having a tapered inner bore 58.

Figure 2:
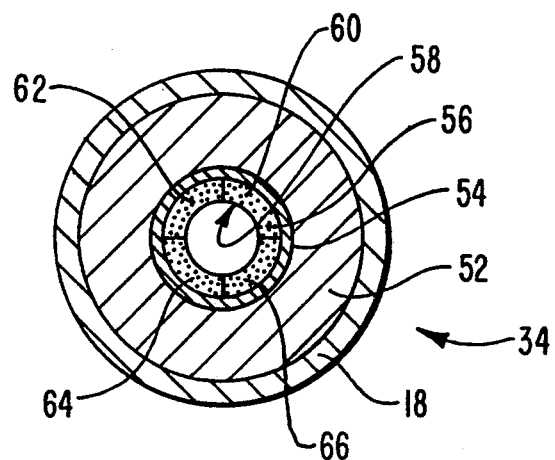
FIG. 2 is a cross-section of the motor of FIG. 1, taken along line 2—2.
Figure 3:
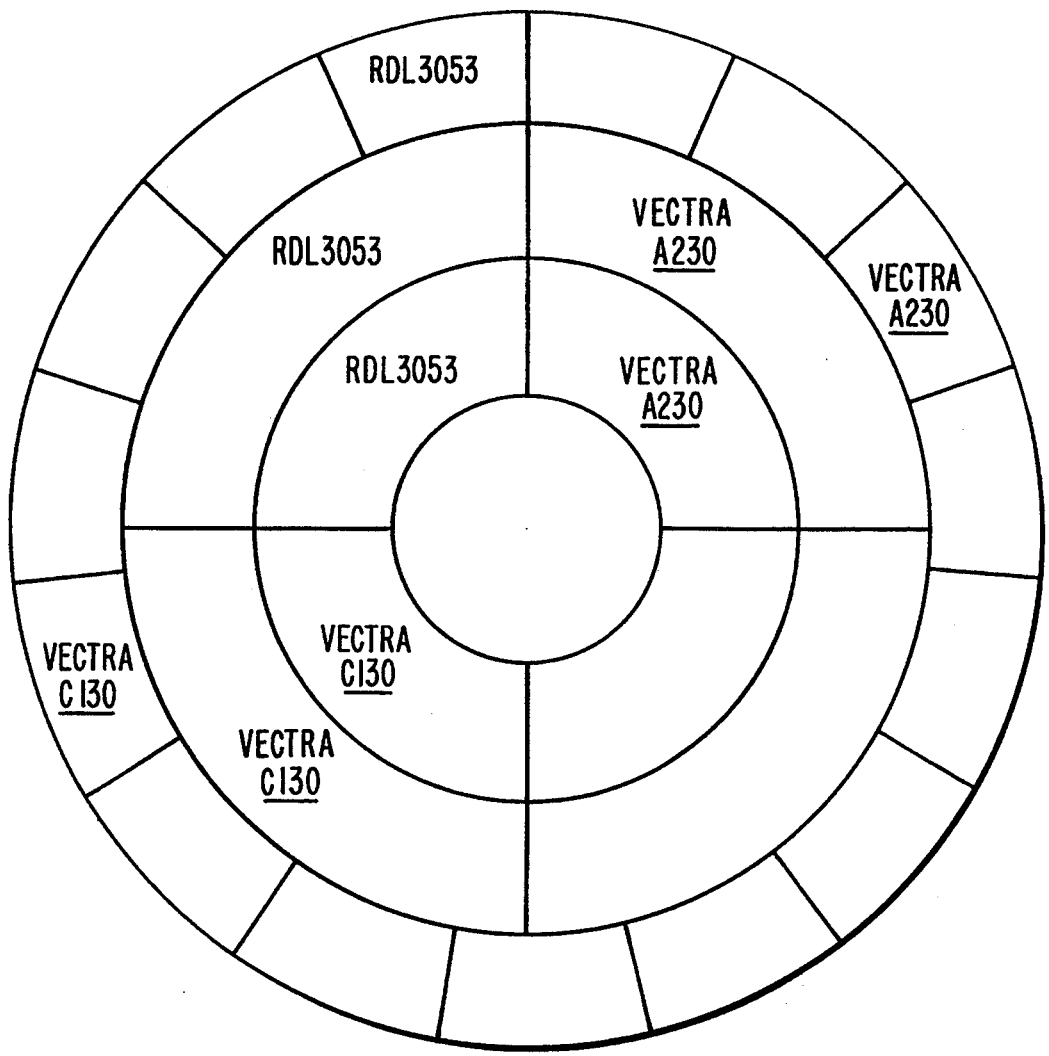
FIG. 3 is a graphical representation of a sample layout of insulation samples to be tested within a test motor.

Insulators 40, 48, and 56 are each made up of circumferentially adjacent segments such as segments 60, 62, 64, 66 of insulator 56 shown in FIG. 2. This arrangement allows segments of different materials to be compared under substantially identical conditions, with a minimum number of test firings. FIG. 3 illustrates an exemplary sample layout of materials tested within one segment of one such a test motor. It will be appreciate that numerous samples can be tested simultaneously and directly comparable data obtained.

When end 68 of grain 22 is ignited by ignition system 28, the products of combustion are directed by spacer 24, bore 42, spacer 30, bore 50, and bore 58 through nozzle assembly 36. Because the diameters of the spacer and bores decrease from fore to aft, the gas velocity increases as the products of combustion flow through the insulated test sections. Thus, insulation performance at different flow velocities can be measured.

Test Data

For each insulation sample and flow velocity, the average insulation weight loss (as a percentage of pre-firing weight) and material affected rate (MAR) were measured. The MAR, measured in microns per second, was determined by measuring the reduction in thickness of the insulation sample, divided by the time required for the propellant to be consumed, which was measured for each test. Both MAR and weight loss are measures of insulator damage (ablation). Lower numbers indicate better performance.

The following Tables present data obtained from actual test runs in test motors of the type described above. Material affected rate (ablation) data is presented. It can be seen that the VECTRA samples tested compare well with other types of materials. In some instances, the VECTRA performed substantially better than other comparable insulation samples.

TABLE I

COMPARISONS OF MATERIAL AFFECTED RATES

| Combustion Gas Velocity (Mach #) | MAR (mils/sec.) Vectra C130 | RDL3053 |
| --- | --- | --- |
| 0.0028 | 0.87 | 3.04 |
| 0.0449 | 3.82 | 4.57 |
| 0.0524 | 4.67 | 4.57 |
| 0.0572 | 5.91 | 9.24 |
| 0.0705 | 6.34 | 10.03 |
| 0.0747 | 7.31 | 10.07 |
| 0.0860 | 7.42 | 10.59 |
| 0.0964 | 8.69 | 11.86 |
| 0.1088 | 11.14 | 20.45 |
| 0.1102 | 10.33 | 14.14 |
| 0.1104 | 9.21 | 18.63 |
| 0.1112 | 10.72 | 21.21 |
| 0.1162 | 7.57 | 20.22 |
| 0.1216 | 8.53 | 19.53 |
| 0.1252 | 9.44 | 22.36 |
| 0.1331 | 10.13 | 24.23 |
| 0.1394 | 9.12 | 25.31 |
| 0.1479 | 8.8 | 24.35 |

The baseline test material designated RDL3053 represents conventional insulation material and was formulated as follows:

| Elastomers | Polysar 585 | 80.00 | 27.40 | 82.19 |
| --- | --- | --- | --- | --- |
| | Natsyn 2200 | 5.00 | 1.71 | 5.14 |
| Activators | Hypalon 20 | 5.00 | 1.71 | 5.14 |
| | Neoprene FB | 20.00 | 6.85 | 20.55 |
| Antioxidants | Vanox 102 | 1.00 | 0.34 | 1.03 |
| | Dynamer 790 | 1.00 | 0.34 | 1.03 |
| | Stearic Acid | 3.00 | 1.03 | 3.08 |
| Fillers | Austin Black 325 | 105.00 | 35.96 | 107.88 |
| | HiSil 243LD | 25.00 | 8.56 | 25.68 |
| | Kevlar fiber | 10.00 | 3.42 | 10.27 |
| | Kynol 1010 | 20.00 | 6.85 | 20.55 |
| Activators | Antimony Oxide | 5.00 | 1.71 | 5.14 |

-continued

| Curatives | SP-1056 | 12.00 | 4.11 | 12.33 |
| --- | --- | --- | --- | --- |

Of particular interest is the data provided in Table I which relates to the insulating capability of VECTRA C130. Data from VECTRA C130 is compared to data obtained using RDL3053, a KEVLAR containing material. KEVLAR is a trademark of E. I. duPont de Nemours & Co., Wilmington, Del., and comprises an aromatic polyaramid fiber pulp. RDL3053 is comprised of about 3.4% KEVLAR fiber, about 6.9% Kynol fiber, and about 36% powdered filler Austin Black (coal).

In Table I, the insulating capacity of VECTRA C130 is compared to RDL3053 under test conditions. The propellant used was designated TP-H1148 and comprised an aluminized ammonium perchlorate propellant. Initial internal rocket pressure was 832.4 psia. The test involved an action time of 11.87 seconds. Comparisons were made on the observed erosion rate and weight loss of each formulation. All three velocity sections of the motor were tested (low, medium, and high). Table I contains data from a single test motor firing.

The results show the superior performance of the VECTRA C130 sample over the insulating capability of the more traditional insulating formulation RDL3053. These test results are of particular interest in view of the fact that KEVLAR-containing materials have previously been considered excellent insulating materials.

Summary

In summary the present invention provides new and inventive compositions for use in insulating rocket motor casings. The formulations of the present invention provide significant improvements in ablative performance over many known and conventional formulations. At the same time, the present invention provides several other significant advantages associated with the use of thermoplastic liquid crystal polymers. These advantages include ease of processing and handling, chemical resistance, and mechanical properties.

Thus, the primary objects of the present invention have been accomplished. The formulations and methods of the present invention overcome many of the significant limitations of conventional insulation materials. The formulations of the present invention have ablative characteristics superior to those of many existing thermoplastic ablative materials. The compositions of the present invention also have good mechanical properties, provide ease of processing and permit structural components to be fabricated directly from the insulation.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of insulating a rocket motor comprising the steps of:

a. providing an insulation material comprising a thermoplastic liquid crystal polymer and a filler selected from the group consisting of fiber fillers and powdered fillers;

b. fabricating said insulation material to form a thermoplastic rocket motor insulating member; and c. installing said member in a portion of a rocket motor requiring insulation.

2. A method as defined in claim 1 wherein said fabricating step comprises the further steps of forming at least one piece of said thermoplastic insulation material, laying up said at least one piece on a rocket motor component so portions of said at least one piece are in contacting relation, and joining the portions of said at least one piece which are in contacting relation by heat sealing said portions together.

3. A method as defined in claim 2 wherein said joining step is carried out by applying a molten bead of said insulation material polymer between the portions of said at least one piece which are in contacting relation.

4. A method as defined in claim 2 wherein said laying up is carried out by winding a ribbon of said insulation on a component of a rocket motor requiring insulation.

5. A method as defined in claim 1 wherein said insulation is fabricated in a tubular form.

6. A method as defined in claim 5 wherein said tubular form is a preform and said preform is deformed by heat into the final shape of an element of said rocket motor insulation.

7. A method as defined in claim 1 wherein said thermoplastic liquid crystal polymer comprises a wholly aromatic polyester.

8. A method as defined in claim 1 wherein said filler comprises a fiber filler.

9. A method as defined in claim 8 wherein said insulation material comprises from about 0.5% to about 40% fiber filler.

10. A method as defined in claim 8 wherein said fiber filler comprises carbon.

11. A method as defined in claim 8 wherein said fiber filler comprises glass.

12. A method as defined in claim 8 wherein said fiber filler is selected from the group consisting of polybenzimidazole fiber, polyaramid fiber, phenolic fiber, alumina fiber, asbestos, mineral wool, nylon fiber, silica fiber, cotton flock, sisal, and mixtures thereof.

13. A method as defined in claim 1 wherein said filler comprises a powdered filler.

14. A method as defined in claim 13 wherein said insulation material comprises from about 5% to about 45% powdered filler.

15. A method as defined in claim 13 wherein said powdered filler is selected from the group consisting of silica, magnesium silicates, powdered coal, powdered neoprene, aluminum, alumina, ferric oxide, cadmium hydroxide, copper, copper-8-quinolinol, fused magnesia, fused zirconia, potassium titanate, silicon carbide, titania, mica, glass, ceramic clays, chromic oxide, phenolic resin particles, and mixtures thereof.

* * * * *